Nov. 6, 1934.     G. E. RYAN     1,980,000
OIL PRESS
Filed Feb. 13, 1933     6 Sheets-Sheet 1
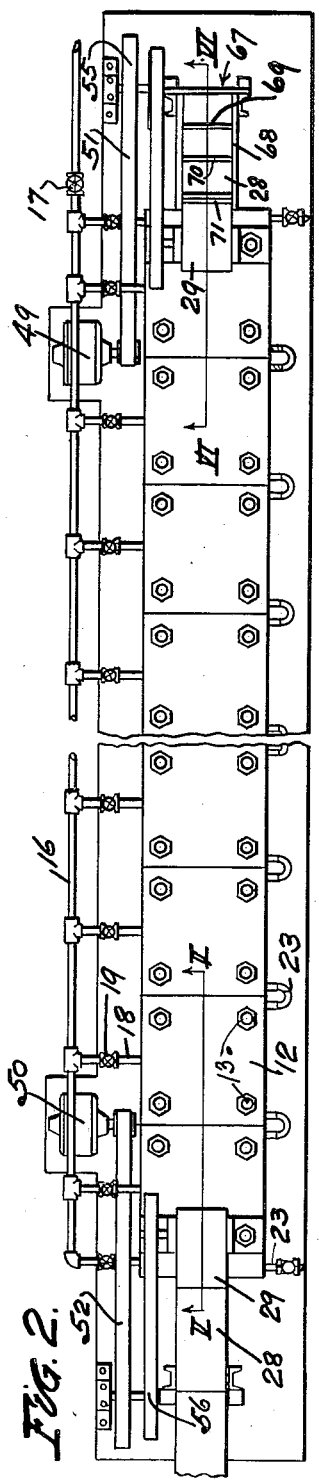
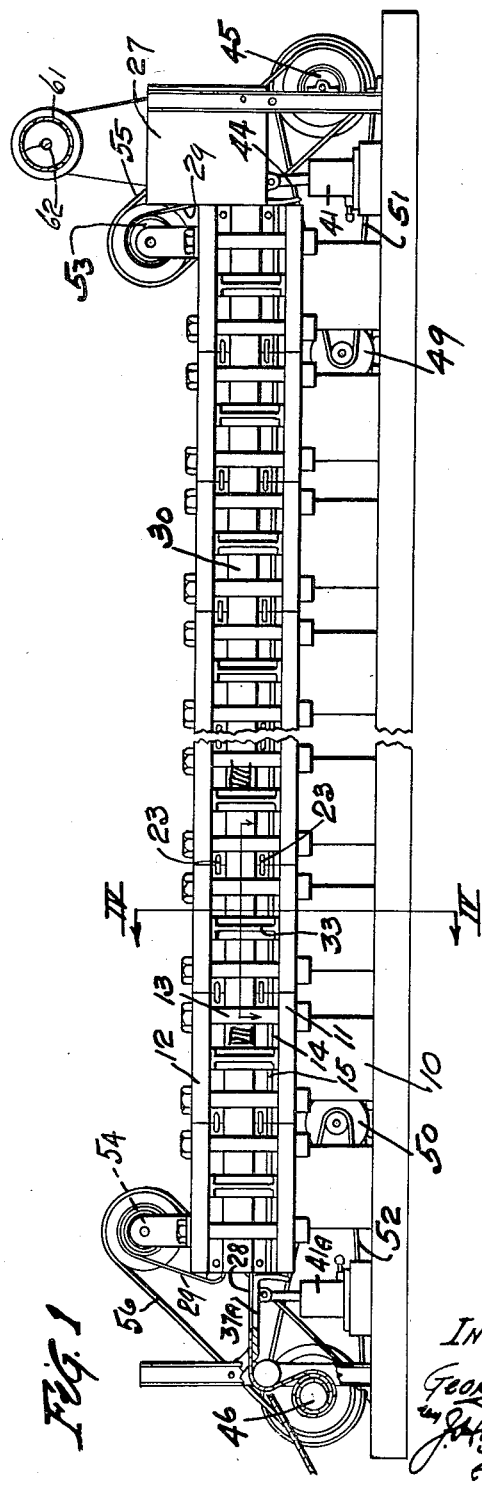
INVENTOR
George E. Ryan
by J. H. Weatherford
ATTY

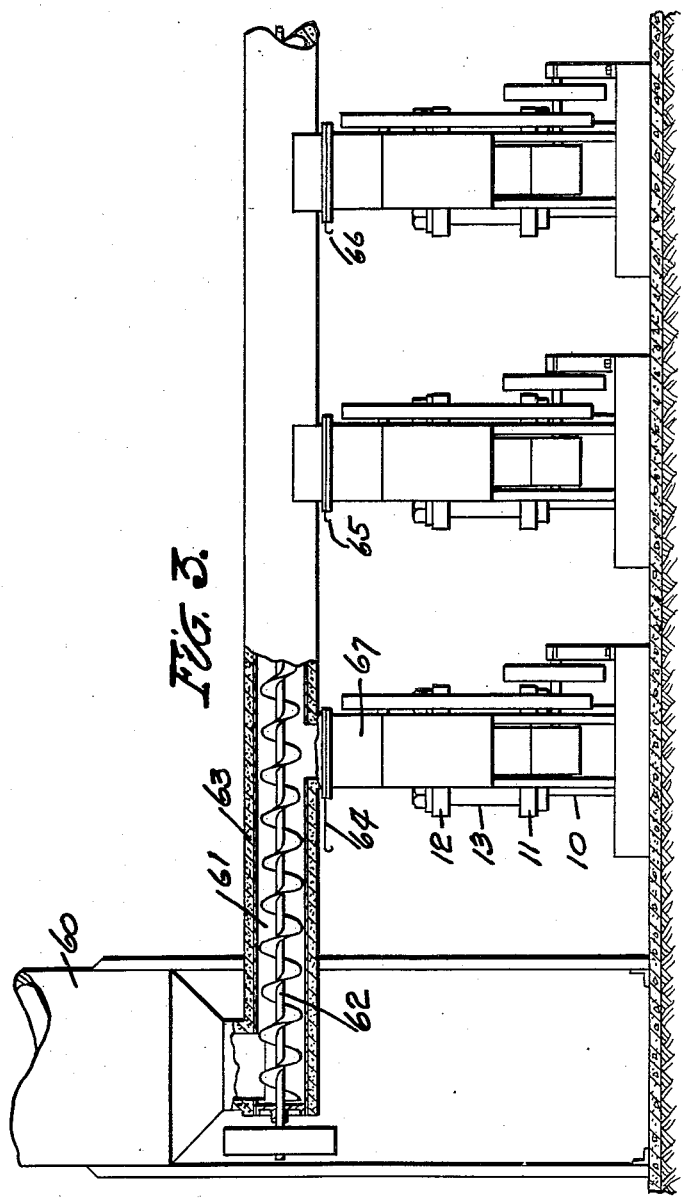

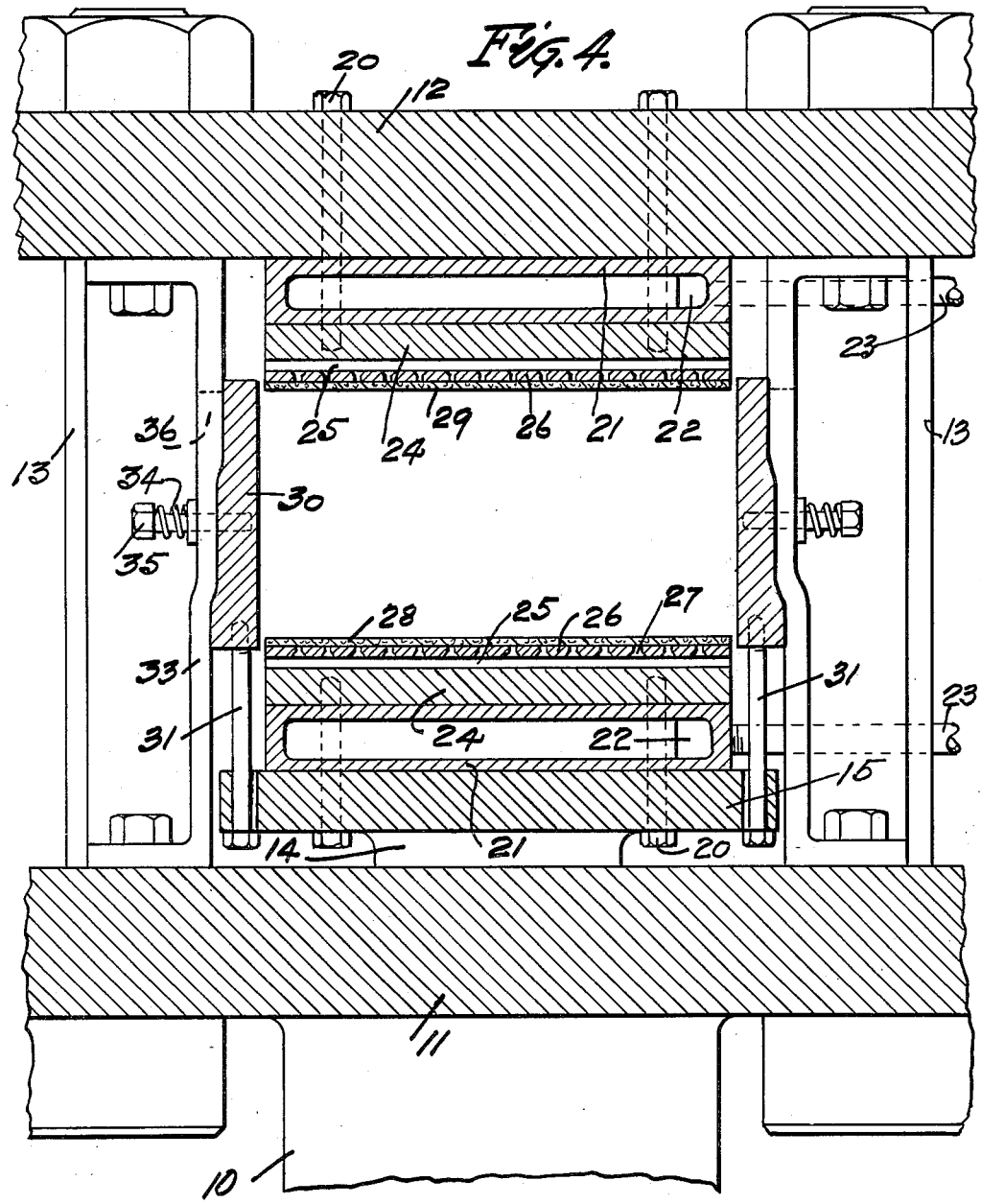

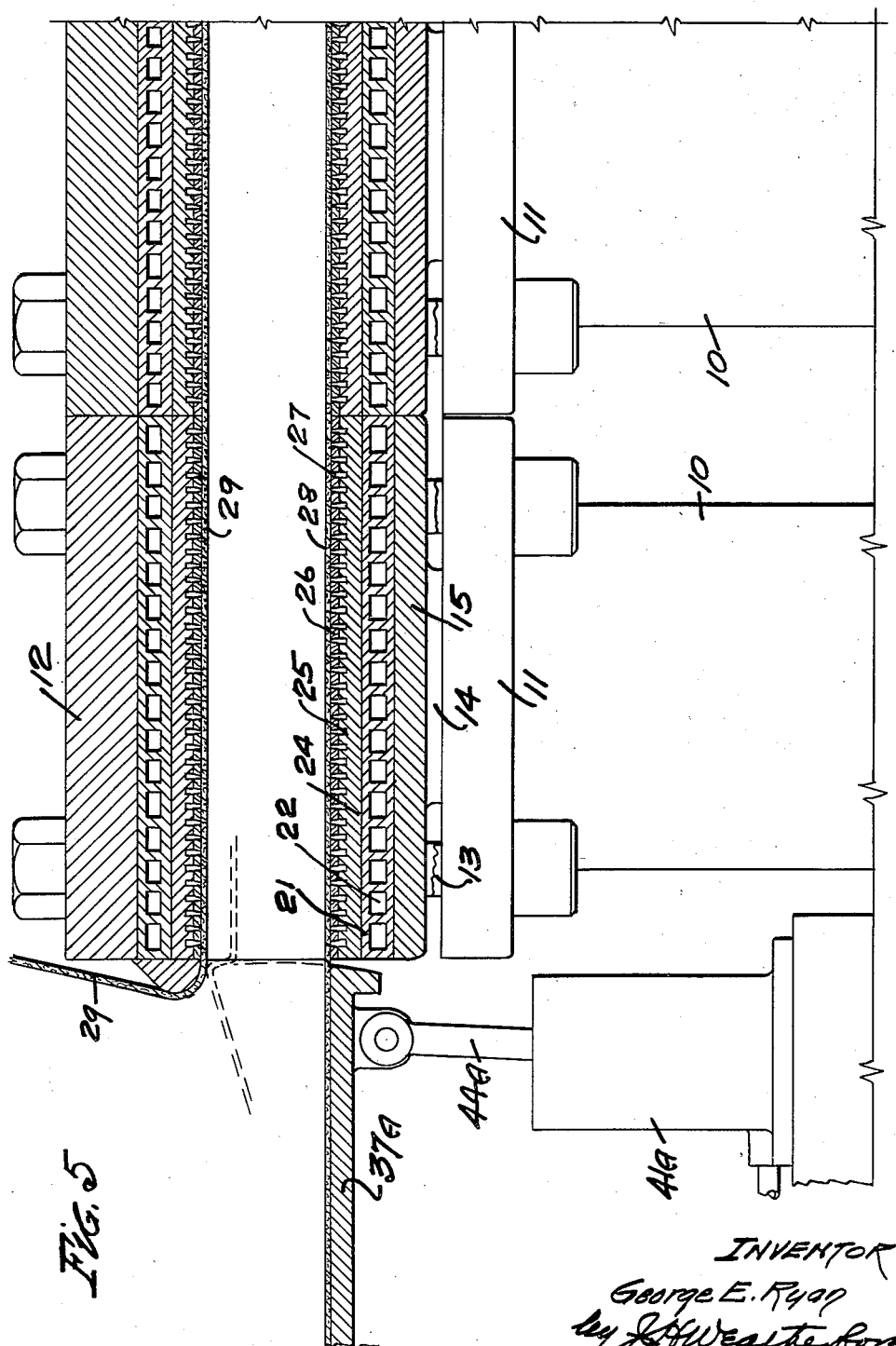

Nov. 6, 1934.  G. E. RYAN  1,980,000
OIL PRESS
Filed Feb. 13, 1933  6 Sheets-Sheet 5
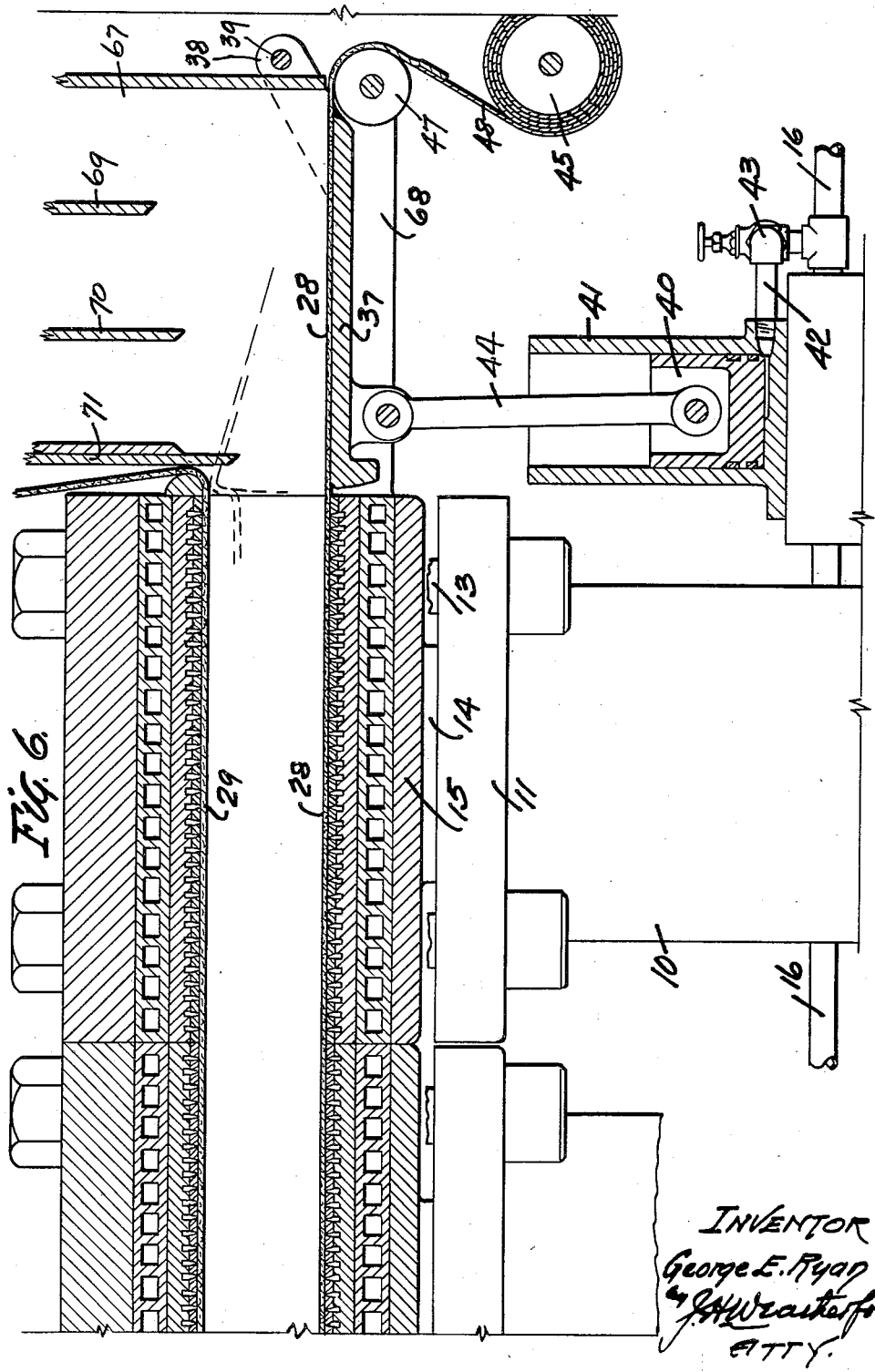
INVENTOR
George E. Ryan
by J H Weatherford
ATTY.

Nov. 6, 1934.  G. E. RYAN  1,980,000
OIL PRESS
Filed Feb. 13, 1933  6 Sheets-Sheet 6
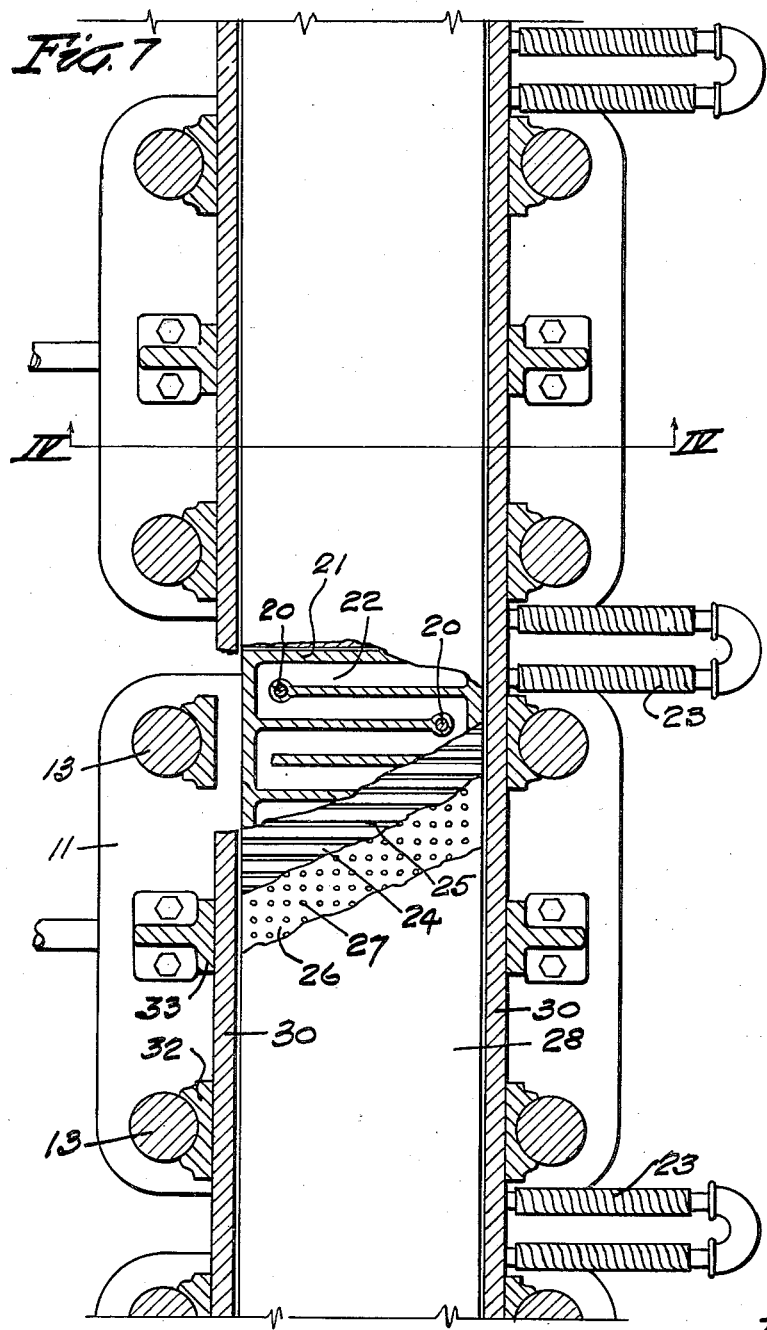

Patented Nov. 6, 1934

1,980,000

UNITED STATES PATENT OFFICE 1,980,000

OIL PRESS

George E. Ryan, Germantown, Tenn.

Application February 13, 1933, Serial No. 656,429

7 Claims. (Cl. 100—36)

This invention relates to improvements in means and methods for expressing liquids from solids and particularly to that class of devices in which the solids, preferably in a powdered or granulated condition, are confined between opposed pressure plates covered by filters, such as filtering cloths, usually known as press cloths, and subjected to heavy pressure, as by a hydraulic ram. It further relates to means and methods of this kind which are intended for accomplishing the extraction while the solids are still hot.

In treating numerous materials, particularly these of vegetable origin, such for instance as granulated cotton seed meats (known as cotton seed meal) it has been found advantageous to pre-heat, or cook, the "meal" in order to break down the cellular structure, but though it is well known that such breaking down is largely temporary, and persist most effectively only so long as heating is maintained, little has been accomplished in maintaining such heating during the pressing cycle. In this class of work it is customary to form a body of the meal into a long flat cake, concurrently wrapping the bottom, top and ends of each cake in a press cloth. A number of such cakes are put each into an individual compartment in the press and subjected to expressing pressure.
In doing this in a cotton seed oil mill, the decorticated seed is ground into meal and this is placed in a cooker, in which it is heated to and held at a temperature of about 235 degrees Fahrenheit. From the cooker it is dropped into a "former" in which the cake is made and wrapped in press cloth. These cakes are shifted manually to a press having compartments or boxes, usually fifteen in number, which are filled each with a single cake before pressing commences.
The drop in temperature of the meal during such period is usually from 50 to 75 degrees, though with the press cold on beginning work a much greater drop occurs, such press cooling often persisting over more than half the working day.
Losses and delays due to such cooling are of such extent as to seriously decrease the yield of oil, as also in some cases the quality also.

Under pressure the cake spreads in the box wedging tightly against the sides and being restrained at its ends by the press cloth. After release of the pressure, each cake is withdrawn, this often, on account of sticking and wedging, involving not only heavy work, but such work damaging both cloth and press box. The cake withdrawn is then stripped of its cloth and the cloth released for further use. The strain due to the restraining action of the cloth on the cake ends, the folding under the action of the high pressure and the detaching of the embedded cloth from the cake result in a short life of this expensive material and add a very considerable cost to the operation.

The primary object of the instant invention is to improve upon, and overcome the objection to the means and methods heretofore known and employed for this purpose, particularly in the following respects;

By providing a press adapted to accomplish the expressing; and in such a press;

By providing means for placing the press cloth in position for the pressing operation and for concurrently transferring the granular material into the press box of the press;

By providing means for laterally contracting the width of the press box during the pressing operation and expanding same on release of the pressure;

By providing means for effecting detachment of the press parts from the press cloth;

By providing means for removing the residual press cake from the press and for stripping the press cloth therefrom;

By providing means for replacing the press cloth in position to receive an additional charge and recommence the cycle;

By providing means for heating the press boxes;

By providing means for optionally effecting concurrent or individual operation of the press units;

By providing means for cooking and transferring the meal optionally to anyone of a battery of such presses;

By providing means for minimizing heat losses during the cycles of operation; and

By improving the detail and design of such structures.

The means by which the foregoing and other objects are accomplished by the instant invention, and the manner of their accomplishment, will readily be understood from the following description on reference to the accompanying drawings, in which:

Fig. 1 is a side elevation showing the press assembly;

Fig. 2 is a corresponding plan view;

Fig. 3 is an end elevation showing three presses and a typical transfer mechanism;

Fig. 4 is a transverse sectional elevation on a much enlarged scale taken as on the line IV—IV of Fig. 1;

Figs. 5 and 6 are fragmentary longitudinal sections taken respectively as on the line V—V and VI—VI of Fig. 2, showing the opposite ends of the press; and Fig. 7 is a typical fragmentary sectional plan taken as on the line VII—VII of Fig. 1.

Referring now to the drawings in which the various parts are indicated by numerals; a press comprises a plurality of related units, substantially identical, associated together in intimate proximity, in each of which units, 10 is a vertically disposed cylinder outwardly flanged at its upper end to form a lower head 11. 12 is an upper head, spaced from the lower head, 13 are column bolts which support and hold the upper head in such spaced relation, and 14 is a plunger, carrying a platen 15. These parts are of usual construction and are not therefore illustrated in detail. Each plunger is raised in usual manner by hydraulic pressure furnished through a main 16 (Fig. 2) which may be controlled as by a valve 17. 18 are branch lines connecting the main to the individual cylinders, each preferably controlled and/or regulated by an individual valve 19. The heads 11 and 12 and platen 15 are of similar length and are assembled with their ends abutting. If desired, the heads may be secured together, though such is not shown, the platens however while touching are free to move independently. Mounted on and secured to each platen as by bolts 20 is a steam chamber 21 which has a continuous tortuous passageway 22 (Fig. 7) therein to which passageway steam may be supplied as through the steam line 23. This line, adjacent its connection to the steam chamber, is of flexible pipe whereby relative movement of adjacent steam chambers is permitted. Supported on the steam chamber 21, and if desired, integral therewith, is a drainage plate 24 having transverse drain channels 25. Secured to this drain plate in any usual or desired manner, is a metal drain plate or mat 26 having rows of holes 27 therethrough which register with the drain grooves 25. The steam chamber 21, drain plate 24 and mat 26 are of the same length as the platen 15, so that their ends abut closely against the similar parts of the adjacent units. A duplicate structure, except that the steam pipe need not be flexible, bearing the same numbers is secured to the upper head. 28 is the lower press cloth and 29 the upper press cloth, both of which extend continuously through the press.

The sides of the press box are formed by side plates 30, which may be of the same length as the individual platens, or may extend the length of the entire press. The side plates are vertically movable being engaged by the underlying portions of the platen 15, as the platen is raised to accomplish compression of the material in the press box. Limit bolts 31, freely slidable through the platen, insure that these plates are brought to their original positions on retraction of the platen. The side plates are held against lateral outward movement, by shoes 32 interposed between the plates and the columns 13, and may be additionally supported, intermediate the columns by struts 33 which are suitably secured to the upper and lower heads 12, 11 respectively as by cap screws. The plates 30 are thickened in successive steps from top to bottom on their outer sides and the shoes 32 and struts 33 are provided with complementary steps whereby the initial upward movement of the plates 30 cause the plates to move inwardly, substantially against the sides of the drainage plates 26 of the press box. The plates 30 may be held against the shoes and the struts, as by springs 34 and bolts 35. The struts 33 are provided with slots 36, in which the bolts 35 are disposed and move freely upward and downward.

The ends of the press may be closed by gate members 37, 37A, which are pivotally supported as by arms 38, which turn about a cross shaft or pin 39. The free ends of these are preferably swung upward, each as by a plunger 40, which is disposed in an auxiliary cylinder 41, connected by a pipe 42 with the hydraulic main 16. 43 is a control valve. 44 is a connecting rod between the plunger 40 and the member 37. In charging position the gate member 37 lies substantially horizontal, so that the lower belt 28 lies thereon in a substantially horizontal position. When pressure is turned on to raise the presses, the plunger 40 acts more rapidly than do the plungers of the press cylinders, moving the gate member 37 upward until the press cloth 28 is brought against the upper press cloth 29 and closure of the end of the box is effected. At the opposite end of the press a similar cylinder 41A, connecting rod 44A, gate member 37A and other parts substantially identical with those just described effects closure of that end.

Release of pressure in the press allows the gate members 37, 37A to drop to their initial position and reopens the ends of the press.

At opposite ends of the press the lower cloth 28, is carried beyond the limits of the press and of the gate members 37, 37A respectively to reels 45, 46, which are independently operable and are substantially identical at the opposite ends of the press. In Fig. 6 the cloth is shown passing over an idler 47 to the reel 45 and an identical structure is used at the opposite end of the press. Preferably the press cloth 28 is of only sufficient length to cover the drainage area of the press and at each end is secured to a lead belt such as the belt 48 (Fig. 6) which belt may be of much less thickness and therefore take up less room on the reel. The reels may be actuated independently by motors 49, 50 through suitable belts 51, 52, and pulleys.

The top cloth 29 likewise is carried beyond the press and to reels 53, 54 at the opposite press ends. Preferably these reels are driven from the associated lower reels 45, 46 as through the belts 55, 56.

In Fig. 3, 60 indicates a cooker which may be of any usual or well known type and need not be here described. This cooker discharges into a conveyor 61, which is typically shown as having a screw flight 62 for accomplishing conveyance of the meal to the various presses. Preferably the conveyor 61 is surrounded with insulation 63. An individual valve 64, 65 and 66 respectively, is provided for each press, the valve 64 to the first press being shown open. Meal transferred by the conveyor flight 62 drops through an opened valve as the valve 64 into a distributing box 67, which is disposed immediately above the lower press cloth 28, and which has its sides 68 extending below the level of the member 37 and the press cloth 28 thereon. Disposed within the distributing box are transverse baffles 69, 70 which function to level up the meal in the box. 71 is an adjustable sliding gate which may be raised or lowered to vary the thickness of the stream of meal moved from the boxes by and on the press cloth 28.

In operating the press, all the plungers are allowed to lower, establishing the fully open position of the press shown in Figs. 4, 5 and 6. Steam is turned into the press boxes through the steam lines 23 and thereafter maintained therein to initially heat and maintain heating of the boxes.

Both the lower and upper press cloths are shifted onto the reels 45 and 53 at the charging end of the press.

Meal is introduced into the cooker 60 and heated or cooked therein in usual manner.

After such cooking the meal is transferred by the conveyor 61 to a press and discharged through the distributor onto the lower press cloth. Reels 46 and 54 are started and the meal is moved, on the lower cloth, into the press, the depth of meal and consequent thickness of the charge being regulated by the height of sliding gate 71.

As the distributed meal reaches the end of the press these reels are stopped and hydraulic pressure released by valve 17, through main 16, to the press cylinders and the auxiliary cylinders 41, 41A, moving the gate members upward to establish end closure and the platens upward to exert expressing pressure. As the platens travel upward they engage the side plates 30 moving them upward and inward to complete the box closure. Should any plunger have a tendency to move much more rapidly than the others, flow to that cylinder may be reduced by its individual control valve. After pressure is fully established, it is held for such period as is necessary to permit full drainage and thereafter released, allowing the platens to move downward to open the press, including the end members and side members. In such release it is often found that the cloth adheres too tightly to the drainage plates to allow the stripping. In such case the plungers are lowered successively, beginning at either end, and each lower mat successively disengaged. Tension established on the lower reel 46, and in extreme cases, also on the reel 45 disengages the cloth from the upper mat. Upper and lower reels 46, 54 respectively, are put in motion to wind the cloth theretoward and strip it from the cake, which latter may be disposed of as may be desired. When stripping has been accomplished, the cloths are rewound on the reels 45, 53 and the press is ready for an additional charge.

Having described my invention, what I claim is:

1. In a device of the character described, an elongated press box, having opposed pressure surfaces, one set of said surfaces being sectional, means for concurrently applying expressing pressure to approach said surfaces, and means for releasing pressure on any of said sections while maintaining pressure on others thereof, whereby to free such released sections.

2. In a device of the character described, an elongated press box, having opposed pressure surfaces, one of said surfaces being in sections, press cloths in said box adapted to separate material to be pressed from said surfaces, means for exerting pressure to relatively approach said surfaces, and means for releasing pressure on any one of said sections while maintaining pressure on others thereof, whereby to detach such released section from the cloth.

3. An expressing device, comprising a plurality of associated units each including a head carrying a drainage structure, oppositely disposed side members, a cylinder, and a plunger in said cylinder carrying a similar drainage structure; said associated units forming an elongated press box, means for applying hydraulic pressure to and releasing same from said cylinders to actuate said plungers, press cloths extending throughout the length of said box and adapted to act as filters for said drainage structures, and means for shifting said cloths whereby to place material in and/or remove residual material from said box.

4. An expressing device, comprising a plurality of associated units each including a head carrying a drainage structure, oppositely disposed side members, a cylinder, and a plunger in said cylinder carrying a similar drainage structure; said associated units forming an elongated press box, means for applying hydraulic pressure to and releasing same from said cylinders to actuate said plungers, press cloths extending throughout the length of said box and adapted to act as filters for said drainage structures, and means independent of the pressure means, for shifting said cloths, whereby to position them to receive material to be placed in said box.

5. An expressing device, comprising a plurality of associated units each including a head carrying a drainage structure, oppositely disposed side members, a cylinder, and a plunger in said cylinder carrying a similar drainage structure, said associated units forming an elongated press box, means for applying hydraulic pressure to and releasing same from said cylinders to actuate said plungers, and means actuated by movement of said plunger-carried structures for contracting the width of said box.

6. An expressing device, comprising a plurality of associated units each including a head carrying a drainage structure, oppositely disposed side members, a cylinder, and a plunger in said cylinder carrying a similar drainage structure; said associated units forming an elongated press box, means for concurrently applying hydraulic pressure, to and independently releasing same from said cylinders to actuate said plungers, and independent means, for closing and releasing opposite ends of said box.

7. An expressing device, comprising a plurality of associated units each including a head carrying a drainage structure, oppositely disposed side members, a cylinder, and a plunger in said cylinder carrying a similar drainage structure; said associated units forming an elongated press box, means for applying hydraulic pressure to and releasing same from said cylinders to actuate said plungers, means actuated by the plungers for contracting the width of said box and independent means for closing opposite ends of said box.

GEORGE E. RYAN.